US012646704B2

(12) United States Patent
Chen et al.

(10) Patent No.: US 12,646,704 B2
(45) Date of Patent: Jun. 2, 2026

(54) SURFACE MODIFIED CATHODE ACTIVE MATERIALS

(71) Applicant: UCHICAGO ARGONNE, LLC, Chicago, IL (US)

(72) Inventors: Zonghai Chen, Bolingbrook, IL (US); Yingying Xie, Woodridge, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 812 days.

(21) Appl. No.: 17/952,583

(22) Filed: Sep. 26, 2022

(65) Prior Publication Data

US 2024/0105908 A1 Mar. 28, 2024

(51) Int. Cl.
| | |
|---|---|
| *H01M 4/04* | (2006.01) |
| *H01M 4/02* | (2006.01) |
| *H01M 4/1391* | (2010.01) |
| *H01M 4/36* | (2006.01) |
| *H01M 4/505* | (2010.01) |
| *H01M 4/525* | (2010.01) |
| *H01M 10/0525* | (2010.01) |

(52) U.S. Cl.
CPC ....... *H01M 4/0471* (2013.01); *H01M 4/1391* (2013.01); *H01M 4/366* (2013.01); *H01M 4/505* (2013.01); *H01M 4/525* (2013.01); *H01M 10/0525* (2013.01); *H01M 2004/021* (2013.01); *H01M 2004/028* (2013.01); *Y02E 60/10* (2013.01)

(58) Field of Classification Search
CPC .. H01M 4/0471; H01M 4/1391; H01M 4/366; H01M 4/505; H01M 10/0525; H01M 2004/021; H01M 2004/028; H01M 4/525; Y02E 60/10
See application file for complete search history.

(56) References Cited

U.S. PATENT DOCUMENTS

| | | | | |
|---|---|---|---|---|
| 8,187,746 B2 * | 5/2012 | Chen | ..................... | H01M 4/623 252/182.1 |
| 10,050,261 B2 | 8/2018 | Myung et al. | | |
| 2018/0309164 A1 * | 10/2018 | Tang | ..................... | H01M 4/366 |
| 2022/0077449 A1 * | 3/2022 | Mukherjee | ............ | H01M 4/661 |

(Continued)

OTHER PUBLICATIONS

U.S. Appl. No. 17/207,445, filed Mar. 19, 2021.

(Continued)

*Primary Examiner* — Maria Laios
*Assistant Examiner* — Lawrence La Raia, III
(74) *Attorney, Agent, or Firm* — Foley & Lardner LLP

(57) ABSTRACT

A process for modifying a surface chemistry of a cathode active material includes providing a powder of the cathode active material, wetting the powder of cathode active material with an efficient amount of a solution to form a mixture, and baking the mixture to obtain a surface modified cathode active material, wherein: the cathode active material has a formula of $LiNi_xMn_yCo_{1-x-y}O_2$, wherein $0 \leq x \leq 1$, $0 \leq y \leq 1$, and $0 \leq x+y \leq 1$; the solution comprises a solvate and a solvent; and the solvate comprises $H_3BO_3$, $H_3PO_4$, a phosphate salt, a hydrogenphosphate salt, a dihydrogenphosphate salt, or a combination of any two or more thereof.

9 Claims, 14 Drawing Sheets

(56) References Cited

U.S. PATENT DOCUMENTS

2022/0231281 A1 * 7/2022 Eom ................. H01M 10/0525

OTHER PUBLICATIONS

Chen, Y., et al. Journal of Wuhan University of Technology—Mater. Sci. Ed. Jun. 2009.
Wu, F., et al. ACS Appl. Mater. Interfaces 2015, 7, 6, pp. 3773-3781.
Xie, Q., et al. Chem. Mater. 2020, 32, pp. 7413-7424.

* cited by examiner

SURFACE MODIFIED CATHODE ACTIVE MATERIALS

STATEMENT OF GOVERNMENT INTEREST

This invention was made with government support under Contract No. DE-AC02-06CH11357 awarded by the U.S. Department of Energy. The government has certain rights in the invention.

FIELD

The present invention relates generally to the field of lithium rechargeable batteries. More particularly, it relates to processes for modifying surface chemistry of a cathode material, as well as the resulting cathode materials and uses thereof.

BACKGROUND

Lithium-ion batteries are a class of electrochemical cells composing of an anode, a cathode, and a non-aqueous electrolyte and separator sandwiched between the anode and the cathode. During charging process, lithium ions are removed from the cathode, diffuse through the non-aqueous electrolyte, and then insert into the anode. The reverse process occurs during the discharging process. Exemplary anode material for lithium-ion batteries includes, but is not limited to, mesocarbon microbeads, natural graphite, synthetic graphite, soft carbon, hard carbon, and Si-based alloys. Exemplary cathode material includes, but is not limited to, $LiFePO_4$, $LiFe_xMn_{1-x}PO_4$ ($0 \leq x \leq 1$), and $LiNi_xMn_yCo_{1-x-y}O_2$ ($0 \leq x \leq 1$, $0 \leq y \leq 1$, $0 \leq x+y \leq 1$). For example, a cathode electrode can be fabricated by: mixing the cathode material, carbon black conducting filler, and a polymeric binder such as poly(vinylene difluoride) (PVDF) in an organic solvent (e.g., n-methyl-2-pyrrolidone) to form a viscous slurry; casting the slurry on a current collector, such as aluminum foil; and drying the wet film at an elevated temperature to obtain the final cathode electrode.

Being the dominant cathode material for lithium-ion batteries, $LiNi_xMn_yCo_{1-x-y}O_2$ ($0 \leq x \leq 1$, $0 \leq y \leq 1$, $0 \leq x+y \leq 1$) is generally synthesized through a solid-state reaction process by sintering the mixture of a transition metal precursor and a lithium source, such as LiOH, LiOH·$H_2O$, or $Li_2CO_3$, at a relatively high temperature. Consequently, a small amount of LiOH/$Li_2CO_3$ usually deposits on the surface of the final cathode material as a basic impurity. More $Li_2CO_3$ can be generated when exposing $LiNi_xMn_yCo_{1-x-y}O_2$ ($0 \leq x \leq 1$, $0 \leq y \leq 1$, $0 \leq x+y \leq 1$) cathode material to ambient conditions during storage. The presence of an excess amount of basic impurity can create a basic environment when preparing the cathode slurry, and potentially trigger the crosslinking reaction of PVDF, leading to the gelation of the slurry and the reduction on the mechanical stability of the final cathode electrode (see *J. Electrochem. Soc.*, 150(8): A1073-A1078, 2003). Moreover, the presence of $Li_2CO_3$ in cathode can also accelerate the parasitic reactions between the cathode electrode and the non-aqueous electrolyte (see *J. Am. Chem. Soc.*, 139(49): 17853-17860, 2017), resulting in an accelerated performance loss of lithium-ion cells. Therefore, there is technological need to actively mitigate the impact of the basic impurities on the surface of cathode materials.

SUMMARY

Provided herein are methods and processes for modifying surface chemistry of a cathode active material, as well as the resulting cathode active material and uses thereof.

In one aspect, provided herein is a process for modifying a surface chemistry of a cathode active material, the process comprising: (a) providing a powder of the cathode active material; (b) wetting the powder of cathode active material with an efficient amount of a solution to form a mixture; and (c) baking the mixture to obtain a surface modified cathode active material; wherein: the cathode active material has a formula of $LiNi_xMn_yCo_{1-x-y}O_2$, wherein $0 \leq x \leq 1$, $0 \leq y \leq 1$, and $0 \leq x+y \leq 1$; the solution comprises a solvate and a solvent; and the solvate comprises $H_3BO_3$, $H_3PO_4$, a phosphate salt, a hydrogenphosphate salt, a dihydrogenphosphate salt, or a combination of any two or more thereof.

In another aspect, provided herein is a cathode active material having a formula of $LiNi_xMn_yCo_{1-x-y}O_2$, wherein $0 \leq x \leq 1$, $0 \leq y \leq 1$, and $0 \leq x+y \leq 1$; and wherein the cathode active material comprises a surface coating layer comprising (1) $LiBO_2$, or (2) $Li_3PO_4$ and a phosphate salt selected from the group consisting of: $Na_3PO_4$, $K_3PO_4$, $Rb_3PO_4$, $Cs_3PO_4$, $Ag_3PO_4$, $Be_3(PO_4)_2$, $Mg_3(PO_4)_2$, $Ca_3(PO_4)_2$, $Sr_3(PO_4)_2$, $Ba_3(PO_4)_2$, $Zn_3(PO_4)_2$, $Mn_3(PO_4)_2$, $Co_3(PO_4)_2$, $Ni_3(PO_4)_2$, $AlPO_4$, $FePO_4$, $VPO_4$, $TiPO_4$, $SCPO_4$, $YPO_4$, $LaPO_4$, $MnPO_4$, $CoPO_4$, $NiPO_4$, $Ti_3(PO_4)_3$, $V_3(PO_4)_3$, $Zr_3(PO_4)_3$, $Nb_3(PO_4)_3$, $Sn_3(PO_4)_3$, $Pb_3(PO_4)_3$, and a combination of any two or more thereof.

In a related aspect, the present technology provides a lithium rechargeable battery comprising at least one cathode active material of any aspect or embodiment disclosed herein.

BRIEF DESCRIPTION OF THE DRAWINGS

FIGS. 7-9 demonstrate the presence of $Li_3PO_4$ and $AlPO_4$ in the surface modified cathode active material ($LiNi_{0.83}Mn_{0.1}Co_{0.07}O_2$ treated with a 5 wt % $Al(H_2PO_4)_3$ solution).

DETAILED DESCRIPTION

Figure 1:
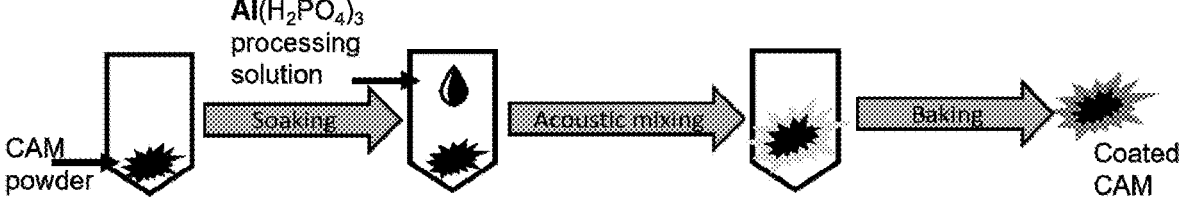
FIG. 1 is a schematic showing the process to modify the surface chemistry of a cathode active material (CAM).

The following terms are used throughout as defined below.

As used in the description and the appended claims, the singular forms "a," "an," and "the" include plural referents unless the context clearly dictates otherwise. Thus, for example, reference to "a composition" includes mixtures of two or more such compositions.

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally, the phrase "consisting essentially of" will be understood to include those elements specifically recited and those additional elements that do not materially affect the basic and novel characteristics of the claimed invention. The phrase "consisting of" excludes any element not specifically specified.

As used herein, "approximately" or "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. For example, in certain embodiments, the term "approximately" or "about" refers to a range of values that fall within 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

"Optional" or "optionally" means that the subsequently described event or circumstance may or may not occur, and that the description includes instances where the event or circumstance occurs and instances where it does not.

As used herein, "phosphate salt" or "phosphate tribasic salt" refers to a class of chemical compounds which are composed of a cation and a phosphate anion ($PO_4^{3-}$).

As used herein, "hydrogenphosphate salt" or "phosphate dibasic salt" refers to a class of chemical compounds which are composed of a cation and a hydrogenphosphate anion ($HPO_4^{2-}$).

As used herein, "dihydrogenphosphate salt" or "phosphate monobasic salt" refers to a class of chemical compounds which are composed of a cation and a dihydrogenphosphate anion ($H_2PO_4^-$).

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

The Present Technology

Provided herein are methods and processes for modifying surface chemistry of a cathode active material, as well as the resulting cathode active material and uses thereof.

In particular, the methods described herein can convert basic impurities on the surface of cathode materials into a beneficial coating layer, which can enhance the electrochemical performance of the cathode materials. Additionally, the cost of manufacturing a cathode active material can be reduced by using the present processes. For example, the processes described herein can 1) allow the preparation of a cathode active material under a dry air atmosphere instead of a pure oxygen atmosphere; 2) reduce the amount of chemical waste compared to a traditional method, as a washing step is generally involved in a traditional method; 3) reduce the number of steps for surface modifying a cathode active material, as an additional coating step (e.g., to coat the cathode active material with a protecting layer) is not requisite in the present processes.

In an aspect, the present technology provides methods and processes for modifying surface chemistry of a cathode active material. An illustrative figure showing said process is provided in FIG. 1.

In some embodiments, the process for modifying surface chemistry of a cathode active material comprises (a) providing a powder of the cathode active material. In some embodiments, the process for modifying surface chemistry of a cathode active material further comprises (b) wetting the powder of cathode active material with an efficient amount (e.g., an amount as described herein) of a solution (e.g., a solution as described herein) to form a mixture. In some embodiments, the process for modifying surface chemistry of a cathode active material further comprises (c) baking the mixture (e.g., a mixture of the cathode active material and the solution as described herein) to obtain a surface modified cathode active material. In some embodiments, the process described herein comprises steps (a), (b) and (c). In some embodiments, the process described herein excludes a step of isolating the cathode active material or a reaction product thereof from the mixture (e.g., a mixture of the cathode active material and the solution as described herein) before step (c).

In some embodiments, the cathode active materials are used for rechargeable lithium batteries and lithium-ion batteries. In some embodiments, the cathode active material has a formula of $LiNi_xMn_yCo_{1-x-y}O_2$ ($0 \leq x \leq 1$, $0 \leq y \leq 1$, $0 \leq x+y \leq 1$). In some embodiments, the cathode active materials further comprise a doping element. Exemplary doping elements include, but are not limited to, Mg, Ca, Zr, Ti, Ta, V, Cr, Fe, Zn, Al, and any combination of two or more thereof.

In some embodiments, the process described herein further comprises preparing the cathode active material under a dry air atmosphere.

In some embodiments, the solution comprises at least one solvent and at least one solvate.

In some embodiments, the solution comprises a solvent. Suitable solvents include, but are not limited to water, methanol, ethanol, 2-propanol, iso-butanol, acetone, ethyl methyl ketone, and any combination of two or more thereof.

In some embodiments, the solution comprises a solvate. Suitable solvates include, but are not limited to, $H_3BO_3$, $H_3PO_4$, a phosphate salt, a hydrogenphosphate salt, a dihydrogenphosphate salt, and a combination of any two or more thereof. For example, a solvate may be $H_3BO_3$, $H_3PO_4$, $M^I(H_2PO_4)$, $M^I_2(HPO_4)$, $M^{II}(H_2PO_4)_2$, $M^{II}(HPO_4)$, $M^{III}$ $(H_2PO_4)_3$, $M^{III}_2(HPO_4)_3$, $M^{IV}(H_2PO_4)_4$, or $M^{IV}(HPO_4)_2$. In some embodiments, $M^I$ is selected from the group comprising Li, Na, K, Rb, Cs, $NH_4$, Ag, and any combination of two or more thereof. In some embodiments, $M^{II}$ is selected from the group comprising Be, Mg, Ca, Ba, Sr, Zn, Mn, Ni, Co, and any combination of two or more thereof. In some embodiments, $M^{III}$ is selected from the group comprising Al, Fe, V, Ti, Sc, Y, La, Mn, Co, Ni, and any combination of two or more thereof. In some embodiments, $M^{IV}$ is selected from the group comprising Ti, V, Zr, Nb, Sn, Pb, and any combination of two or more thereof. In some embodiments, the solvate comprises $Al(H_2PO_4)_3$, $Mg(H_2PO_4)_2$, or $Ca(H_2PO_4)_2$.

In some embodiments, the process comprises wetting the powder of cathode active material with an efficient amount of a solution (e.g., a solution as described herein) to form a mixture. In some embodiments, the efficient amount of the solution is from about 2 wt % to about 80 wt %, preferably from about 5 wt % to about 40 wt %, and more preferably from about 10 wt % to about 25 wt %, based on the morphology of the cathode active material. In some embodiments, the efficient amount of the solution is about 2 wt %, about 5 wt %, about 10 wt %, about 15 wt %, about 20 wt %, about 25 wt %, about 30 wt %, about 40 wt %, about 50 wt %, about 60 wt %, about 70 wt %, or 80 wt %, or any value therebetween, based on the morphology of the cathode active material.

In some embodiments, the pH value of the solution described herein is from about 2 to about 10, preferably from about 5 to about 9, and more preferably from about 6 to about 8. In some embodiments, the pH value of the solution described herein is about 2, 3, 4, 5, 6, 7, 8, or 9, or any value therebetween.

In some embodiments, the concentration of the solvate in the solution described herein is from about 0.5 wt % to about 30 wt %, preferably from about 1 wt % to about 15 wt %, more preferably form about 1 wt % to about 5 wt %. In some embodiments, the concentration of the solvate in the solution described herein is about 0.5 wt %, about 1 wt %, about 5 wt %, about 10 wt %, about 15 wt %, about 20 wt %, about 25 wt %, or about 30 wt %, or any value therebetween.

In some embodiments, the mixture (e.g., the mixture of the cathode active material and the solution as described herein) is baked at an elevated temperature to remove the solvent. For example, the mixture can be baked at a temperature from about 100° C. to about 800° C., preferably from about 400° C. to about 700° C., and more preferably from about 500° C. to about 650° C. In some embodiments, the mixture can be baked at a temperature of about 100° C., about 200° C., about 300° C., about 400° C., about 500° C., about 600° C., about 700° C., or about 800° C., or any value therebetween.

The mixture (e.g., the mixture of the cathode active material and the solution as described herein) can be baked for a sufficient time period at a temperature described herein. For example, the mixture can be baked from about 0.5 hour to about 20 hours, preferably from about 1 hour to about 5 hours. In some embodiments, the mixture can be baked for about 0.5 hour, about 1 hour, about 2 hour, about 3 hour, about 5 hour, about 10 hour, about 15 hour, or about 20 hour, or any value therebetween.

In another aspect, described herein are surface modified cathode active materials (e.g., surface modified cathode active materials prepared by a process described herein). In some embodiments, the surface modified cathode active material is $LiNi_xMn_yCo_{1-x-y}O_2$ ($0 \leq x \leq 1$, $0 \leq y \leq 1$, $0 \leq x+y \leq 1$), which comprises a surface coating layer comprising $Li_3PO_4$, $B_2O_3$, $Li_xBO_2$ ($0 \leq x \leq 1$), or any combination of two or more hereof. In some embodiments, the surface modified cathode active material described herein further comprises another phosphate salt (e.g., $Na_3PO_4$, $K_3PO_4$, $Rb_3PO_4$, $Cs_3PO_4$, $Ag_3PO_4$, $Be_3(PO_4)_2$, $Mg_3(PO_4)_2$, $Ca_3(PO_4)_2$, $Sr_3(PO_4)_2$, $Ba_3$ $(PO_4)_2$, $Zn_3(PO_4)_2$, $Mn_3(PO_4)_2$, $Co_3(PO_4)_2$, $Ni_3(PO_4)_2$, $AlPO_4$, $FePO_4$, $VPO_4$, $TiPO_4$, $ScPO_4$, $YPO_4$, $LaPO_4$, $MnPO_4$, $CoPO_4$, $NiPO_4$, $Ti_3(PO_4)_3$, $V_3(PO_4)_3$, $Zr_3(PO_4)_3$, $Nb_3$ $(PO_4)_3$, $Sn_3(PO_4)_3$, $Pb_3(PO_4)_3$, or any combination of two or more hereof).

In some embodiments, the surface modified cathode active material described herein comprises $LiBO_2$ and a phosphate salt selected from the group consisting of: $Li_3PO_4$, $Na_3PO_4$, $K_3PO_4$, $Rb_3PO_4$, $Cs_3PO_4$, $Ag_3PO_4$, $Be_3$ $(PO_4)_2$, $Mg_3(PO_4)_2$, $Ca_3(PO_4)_2$, $Sr_3(PO_4)_2$, $Ba_3(PO_4)_2$, $Zn_3$ $(PO_4)_2$, $Mn_3(PO_4)_2$, $Co_3(PO_4)_2$, $Ni_3(PO_4)_2$, $AlPO_4$, $FePO_4$, $VPO_4$, $TiPO_4$, $SCPO_4$, $YPO_4$, $LaPO_4$, $MnPO_4$, $CoPO_4$, $NiPO_4$, $Ti_3(PO_4)_3$, $V_3(PO_4)_3$, $Zr_3(PO_4)_3$, $Nb_3(PO_4)_3$, $Sn_3$ $(PO_4)_3$, $Pb_3(PO_4)_3$, and a combination of any two or more thereof. In some embodiments, the surface modified cathode active material described herein comprises $Li_3PO_4$ and a phosphate salt selected from the group consisting of: $Na_3PO_4$, $K_3PO_4$, $Rb_3PO_4$, $Cs_3PO_4$, $Ag_3PO_4$, $Be_3(PO_4)_2$, $Mg_3(PO_4)_2$, $Ca_3(PO_4)_2$, $Sr_3(PO_4)_2$, $Ba_3(PO_4)_2$, $Zn_3(PO_4)_2$, $Mn_3(PO_4)_2$, $Co_3(PO_4)_2$, $Ni_3(PO_4)_2$, $AlPO_4$, $FePO_4$, $VPO_4$, $TiPO_4$, $ScPO_4$, $YPO_4$, $LaPO_4$, $MnPO_4$, $CoPO_4$, $NiPO_4$, $Ti_3(PO_4)_3$, $V_3(PO_4)_3$, $Zr_3(PO_4)_3$, $Nb_3(PO_4)_3$, $Sn_3(PO_4)_3$, $Pb_3(PO_4)_3$, and a combination of any two or more thereof. In some embodiments, the surface modified cathode active material described herein comprises $Li_3PO_4$ and a phosphate salt comprising $Mg_3(PO_4)_2$, $Ca_3(PO_4)_2$, or $AlPO_4$.

In some embodiments, the cathode active material described herein further comprises a doping element, including but not limited to Mg, Ca, Zr, Ti, Ta, V, Cr, Fe, Zn, Al, and any combination of two or more hereof.

In some embodiments, the cathode active materials described herein are used for rechargeable lithium batteries and lithium-ion batteries.

In another aspect, the present technology provides a rechargeable battery comprising at least one cathode active material as described herein.

The examples herein are provided to illustrate advantages of the present technology. The examples herein are also presented in order to more fully illustrate the preferred aspects of the present technology. The examples should in no way be construed as limiting the scope of the present technology, as defined by the appended claims. The examples can include or incorporate any of the variations, aspects, or embodiments of the present technology described above. The variations, aspects, or embodiments described above may also further each include or incorporate the variations of any or all other variations, aspects, or embodiments of the present technology.

EXAMPLES

Reagents and General Methods.

Reagents $Al(H_2PO_4)_3$, $H_3PO_4$, $MgHPO_4$, $Ca(H_2PO_4)_2$ and $LiNi_{0.6}Mn_{0.2}Co_{0.2}O_2$ powder were used as received from commercial suppliers. $LiNi_{0.83}Mn_{0.1}Co_{0.07}O_2$ was synthesized in house, by calcined $LiNi_{0.83}Mn_{0.1}Co_{0.07}O_2$ $(OH)_2$ and $LiOH \cdot H_2O$ at 780° C. for 12 hours.

The electrochemical properties were tested in coin-type 2032R cells with lithium metal as a counter electrode. A slurry composing of active cathode material, conductive additive (Carbon45), and binder (polyvinylidene-fluoride, PVDF) were prepared using N-methyl-2-pyrrolidone (NMP) as the solvent, with a mass ratio of 92:4:4 (cathode/binder/conductive additive). The obtained slurry was applied onto an Al current collector, dried, and then punched into 14 mm diameter disks with cathode loading level of 9-10 mg cm$^{-2}$. The electrolyte consisting of 1.2M $LiPF_6$ in ethylene carbonate/ethyl methyl carbonate solution (EC:EMC=3:7 by wt.) was used. The half coin cells were assembled in an Ar-filled glove box, each coin cell consisted of a cathode electrode and a Li chip anode electrode with a layer of separators in between.

Galvanostatic cycle tests were performed in voltage range from 2.5 to 4.4 V (vs Li+/Li), with a constant current of C/3.

Electrochemical impedance spectroscopy (EIS) was carried out using an electrochemical workstation (Solartron) at a frequency range of $10^{-1}$-$10^6$ Hz (1 MHz to 1 mHz) and a 5 mV amplitude was applied. All the electrochemical tests were performed at 25° C.

Example 1

Preparation of the solutions. A series of $Al(H_2PO_4)_3$ solutions with certain concentration levels (e.g., 0.5, 1, 2, 3, and 5 wt % as shown in FIG. 2) were prepared by dissolving the corresponding amounts of $Al(H_2PO_4)_3$ in deionized water.

Preparation of the surface modified cathode active materials. ~1 g of the $Al(H_2PO_4)_3$ solution was added to ~5 g of $LiNi_{0.6}Mn_{0.2}Co_{0.2}O_2$ powder to form a wet powder. The resulting wet powder was then baked at 550° C. for 6 hours to obtain a surface modified cathode active material.

Half cell test. The obtained cathode active materials were tested in half cell configuration between 2.5 V and 4.4V with a constant current of C/3. FIG. 2 compares the capacity retention of $LiNi_{0.6}Mn_{0.2}Co_{0.2}O_2$ cathode material with and without surface modification using an $Al(H_2PO_4)_3$ solution.

Figure 2:
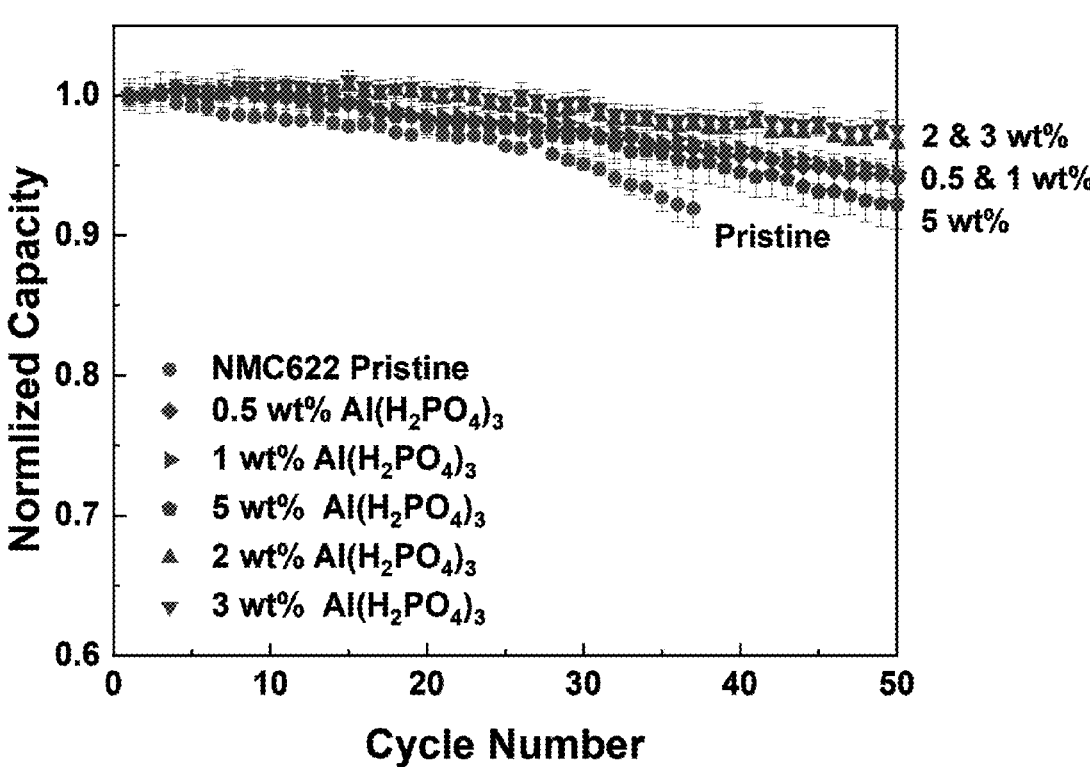
FIG. 2 shows normalized capacities obtained using cathode active materials without surface modification (NMC622 pristine), as well as cathode active materials treated with 0.5 wt % $Al(H_2PO_4)_3$, 1 wt % $Al(H_2PO_4)_3$, 5 wt % $Al(H_2PO_4)_3$, 2 wt % $Al(H_2PO_4)_3$, and 3 wt % $Al(H_2PO_4)_3$, respectively, illustrating the impact of $Al(H_2PO_4)_3$ treatment on the capacity retention of $LiNi_{0.6}Mn_{0.2}Co_{0.2}O_2$ cathode.

As shown in FIG. 2, the cathode active material without surface modification (NMC622 Pristine of FIG. 2) loss about 10% of its reversible capacity in 40 cycles. Additionally, as indicated in FIG. 2, surface modification improves the capacity retention of $LiNi_{0.6}Mn_{0.2}Co_{0.2}O_2$, and an optimal performance is obtained from samples processed with a solution containing 2-3 wt % of $Al(H_2PO_4)_3$.

Example 2

Preparation of the solutions. Ethanol based $H_3PO_4$ solutions with certain concentration levels (e.g., 1 wt % and 3 wt % as shown in FIG. 3) were prepared by dissolving the corresponding amounts of $H_3PO_4$ in pure ethanol.

Preparation of the surface modified cathode active materials. ~1 g of the solution was added to ~5 g of $LiNi_{0.6}Mn_{0.2}Co_{0.2}O_2$ powder to form a well-mixed mixture. The resulting mixture was then baked at 550° C. for 6 hours to obtain a surface modified cathode active material.

Half cell test. The obtained cathode active materials were tested in half cell configuration between 2.5 V and 4.4V with a constant current of C/3. FIG. 3 compares the capacity retention of $LiNi_{0.6}Mn_{0.2}Co_{0.2}O_2$ cathode material with and without surface modification using an ethanol based $H_3PO_4$ solution.

Figure 3:
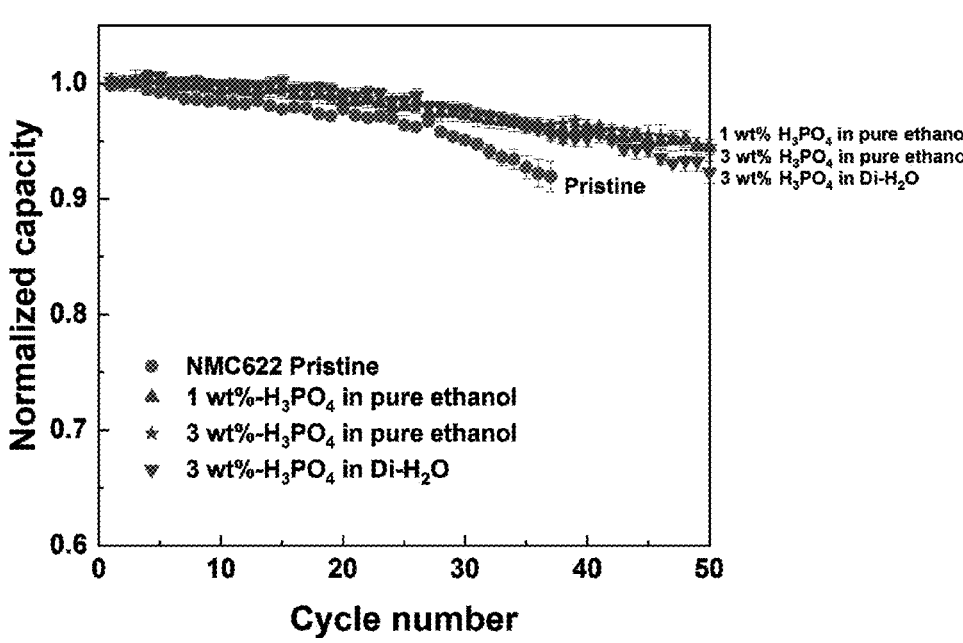
FIG. 3 shows normalized capacities obtained using cathode active materials without surface modification (NMC622 pristine), as well as cathode active materials treated with NMC622 pristine, 1 wt % $H_3PO_4$ in pure ethanol, 3 wt % $H_3PO_4$ in pure ethanol, and 3 wt % $H_3PO_4$ in DI-$H_2O$ (deionized $H_2O$), respectively, illustrating the impact of $H_3PO_4$ treatment on the capacity retention of $LiNi_{0.6}Mn_{0.2}Co_{0.2}O_2$ cathode.

As shown in FIG. 3, surface modification using an ethanol based $H_3PO_4$ solution improves the capacity retention of $LiNi_{0.6}Mn_{0.2}Co_{0.2}O_2$.

Example 3

Preparation of the solutions. A water based $H_3PO_4$ solution (3 wt % $H_3PO_4$) was prepared by dissolving the corresponding amount of $H_3PO_4$ in deionized water.

Preparation of the surface modified cathode active materials. ~1 g of such solution was added to ~5 g of $LiNi_{0.6}Mn_{0.2}Co_{0.2}O_2$ powder to form a well-mixed mixture. The resulting mixture was then baked at 550° C. for 6 hours to obtain a surface modified cathode active material.

Half cell test. The obtained cathode active materials were tested in half cell configuration between 2.5 V and 4.4V with a constant current of C/3. FIG. 3 compares the capacity retention of $LiNi_{0.6}Mn_{0.2}Co_{0.2}O_2$ cathode material with and without surface modification using a water based $H_3PO_4$ solution.

As shown in FIG. 3, surface modification using a water based $H_3PO_4$ solution improves the capacity retention of $LiNi_{0.6}Mn_{0.2}Co_{0.2}O_2$.

Example 4

Preparation of the solutions. An $MgHPO_4$ solution (5 wt % $MgHPO_4$) was prepared by dissolving the corresponding amount of $MgHPO_4$ in deionized water.

Preparation of the surface modified cathode active materials. ~1 g of such solution was added to ~5 g of $LiNi_{0.6}Mn_{0.2}Co_{0.2}O_2$ powder to form a well-mixed mixture. The resulting mixture was then baked at 550° C. for 6 hours to obtain a surface modified cathode active material.

Figure 4:
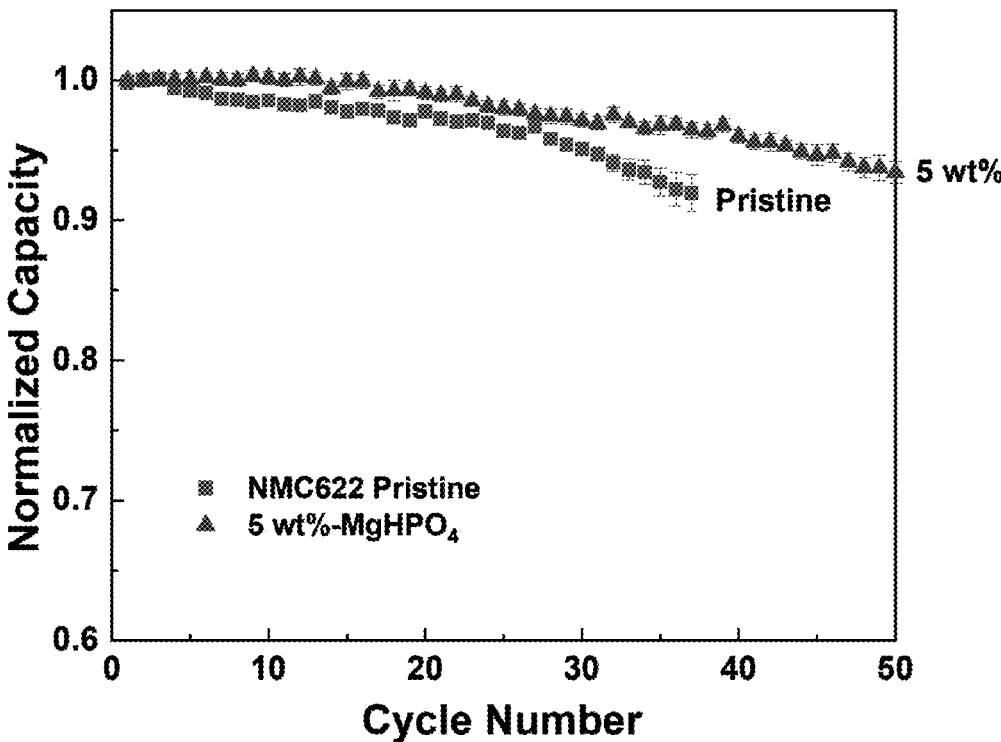
FIG. 4 shows normalized capacities obtained using cathode active materials without surface modification (NMC622 pristine), as well as cathode active materials treated with 5 wt % $MgHPO_4$, illustrating the impact of $MgHPO_4$ treatment on the capacity retention of $LiNi_{0.6}Mn_{0.2}Co_{0.2}O_2$ cathode.

Half cell test. The obtained cathode active materials were tested in half cell configuration between 2.5 V and 4.4V with a constant current of C/3. FIG. 4 compares the capacity retention of $LiNi_{0.6}Mn_{0.2}Co_{0.2}O_2$ cathode material with and without surface modification using an $MgHPO_4$ solution.

As shown in FIG. 4, surface modification using an $MgHPO_4$ solution improves the capacity retention of $LiNi_{0.6}Mn_{0.2}Co_{0.2}O_2$.

Example 5

Figure 5:
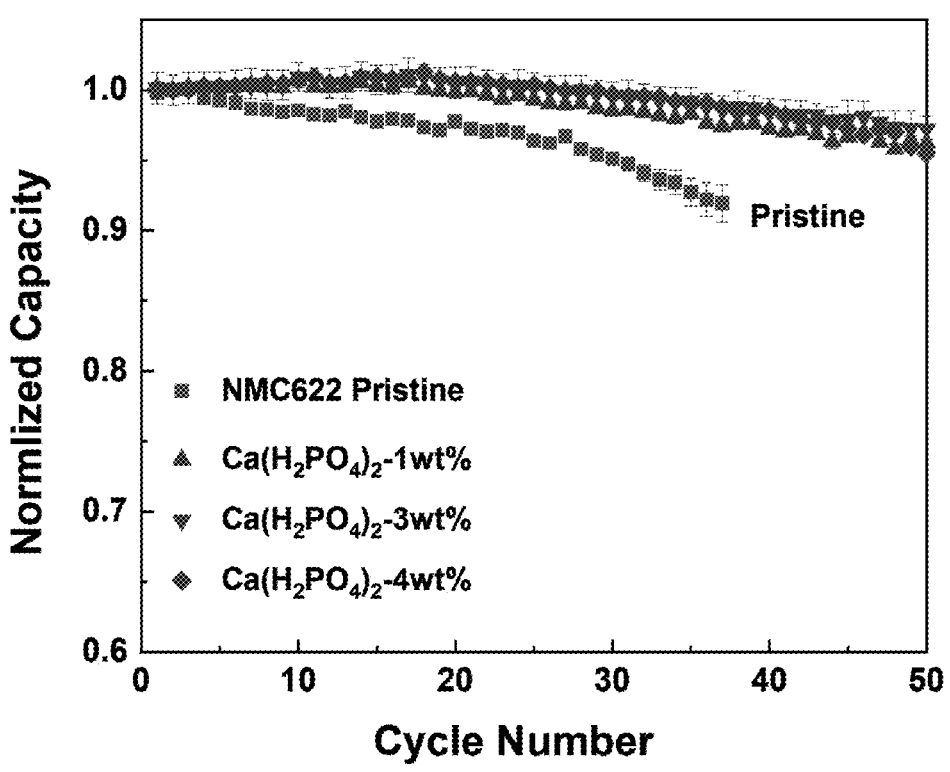
FIG. 5 shows normalized capacities obtained using cathode active materials without surface modification (NMC622 pristine), as well as cathode active materials treated with 1 wt % $Ca(H_2PO_4)_2$, 3 wt % $Ca(H_2PO_4)_2$, and 4 wt % $Ca(H_2PO_4)_2$, respectively, illustrating the impact of $Ca(H_2PO_4)_2$ treatment on the capacity retention of $LiNi_{0.6}Mn_{0.2}Co_{0.2}O_2$ cathode.

Preparation of the solutions. A series of $Ca(H_2PO_4)_2$ solutions with certain concentration levels (e.g., 1 wt %, 3 wt %, and 4 wt % as shown in FIG. 5) were prepared by dissolving the corresponding amounts of $Ca(H_2PO_4)_2$ in deionized water.

Preparation of the surface modified cathode active materials. ~1 g of the solution was added to ~5 g of $LiNi_{0.6}Mn_{0.2}Co_{0.2}O_2$ powder to form a well-mixed mixture.

The resulting mixture was then baked at 550° C. for 6 hours to obtain a surface modified cathode active material.

Half cell test. The obtained cathode active materials were tested in half cell configuration between 2.5 V and 4.4V with a constant current of C/3. FIG. 5 compares the capacity retention of $LiNi_{0.6}Mn_{0.2}Co_{0.2}O_2$ cathode material with and without surface modification using an $Ca(H_2PO_4)_2$ solution.

As shown in FIG. 5, surface modification using a $Ca(H_2PO_4)_2$ solution improves the capacity retention of $LiNi_{0.6}Mn_{0.2}Co_{0.2}O_2$.

Example 6

Preparation of the solutions. A series of $Al(H_2PO_4)_3$ solutions with certain concentration levels (e.g., 1 wt %, 3 wt %, and 5 wt % as shown in FIG. 5) were prepared by dissolving the corresponding amount of $Al(H_2PO_4)_3$ in deionized water.

Preparation of the surface modified cathode active materials. The cathode active material ($LiNi_{0.83}Mn_{0.1}Co_{0.07}O_2$) used in this example was synthesized in a dry air environment. ~1 g of the solution was added to ~5 g of $LiNi_{0.83}Mn_{0.1}Co_{0.07}O_2$ powder to form a well-mixed mixture. The resulting mixture was then baked at 550° C. for 6 hours to obtain a surface modified cathode active material.

Figure 6:
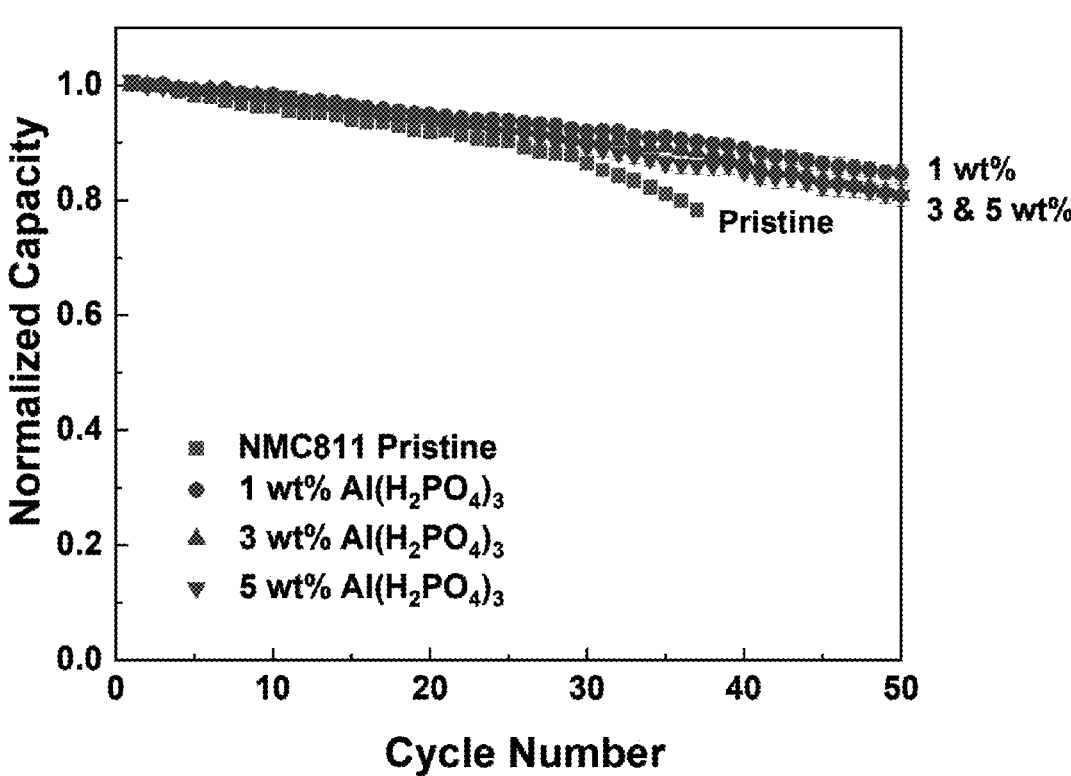
FIG. 6 shows normalized capacities obtained using cathode active materials without surface modification (NMC811 pristine), as well as cathode active materials treated with 1 wt % $Al(H_2PO_4)_3$, 3 wt % $Al(H_2PO_4)_3$, and 5 wt % $Al(H_2PO_4)_3$, respectively, illustrating the impact of $Al(H_2PO_4)_3$ treatment on the capacity retention of $LiNi_{0.83}Mn_{0.1}Co_{0.07}O_2$ cathode.

Half cell test. The obtained cathode active materials were tested in half cell configuration between 2.5 V and 4.4V with a constant current of C/3. FIG. 6 compares the capacity retention of $LiNi_{0.83}Mn_{0.1}Co_{0.07}O_2$ cathode material with and without surface modification using an $Al(H_2PO_4)_3$ solution.

As shown in FIG. 6, the cathode active material without surface modification (NMC811 Pristine of FIG. 6) loss about 20% of its reversible capacity in 40 cycles. Additionally, as indicated in FIG. 6, surface modification improves the capacity retention of $LiNi_{0.6}Mn_{0.2}Co_{0.2}O_2$, and an optimal performance was obtained for samples processed with acidic solution containing 1 wt % of $Al(H_2PO_4)_3$.

Example 7

Identifying $Li_3PO_4$ and $AlPO_4$. The presence of $Li_3PO_4$ and/or $AlPO_4$ in the surface modified cathode active material ($LiNi_{0.83}Mn_{0.1}Co_{0.07}O_2$ treated with a 5 wt % $Al(H_2PO_4)_3$ solution) was characterized using XPS (X-ray photoelectron spectroscopy) and SEM/EDS (scanning electron microscopy (SEM) and energy dispersive X-ray spectroscopy (EDS)). Results are shown in FIGS. 7-9.

Figures 7A, 7B, 7C, 7D:
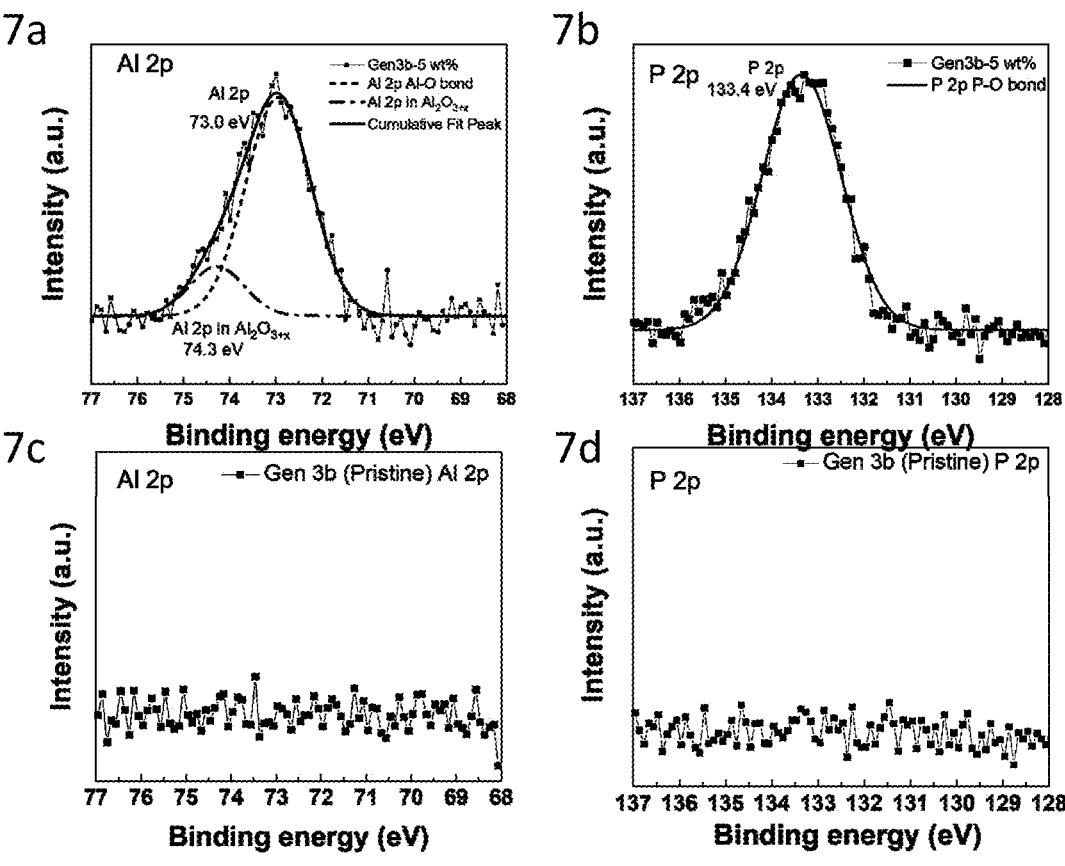
FIGS. 7a-7d show XPS characterization of the cathode active materials with or without surface modification (7a-7b: with surface modification; 7c-7d: without surface modification).
Figures 8A, 8B, 8C, 8D:
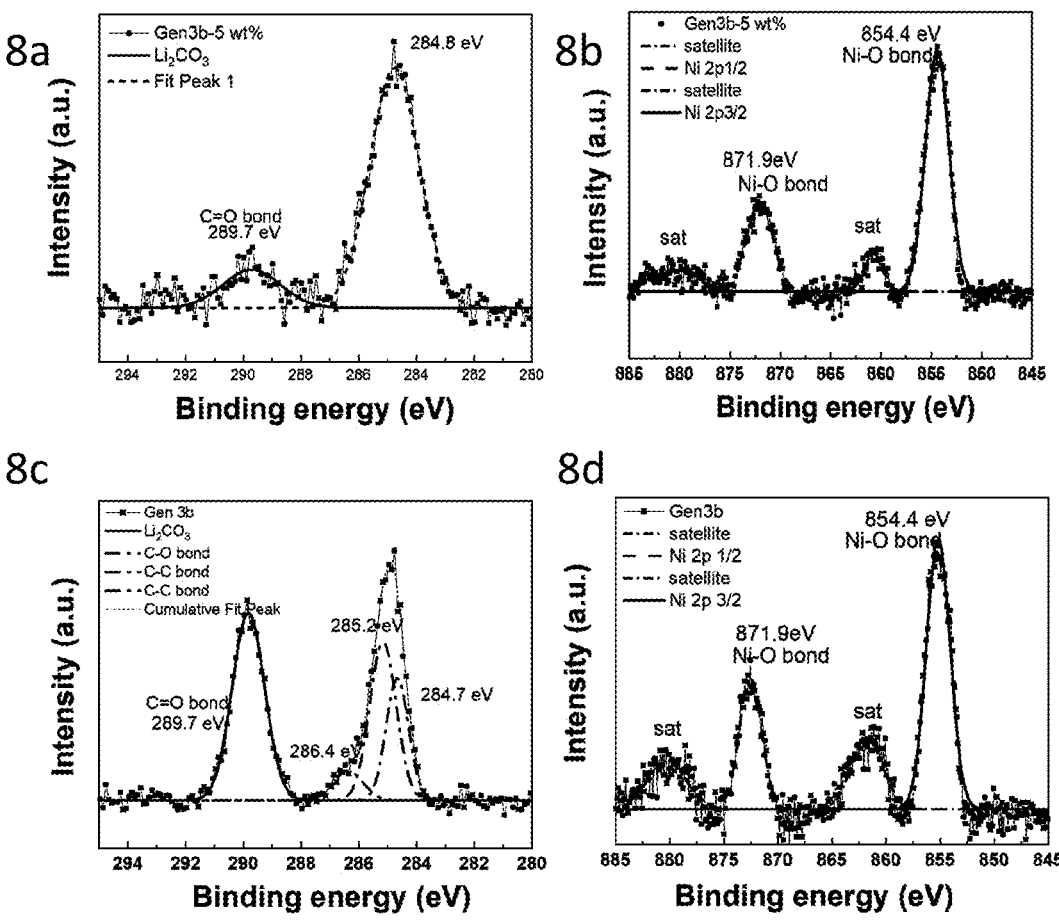
FIGS. 8a-8d compare $Li_2CO_3$/Ni peak area ratios of the cathode active materials with or without surface modification (8a-8b: with surface modification; 8c-8d: without surface modification).
Figures 9A, 9B, 9C:
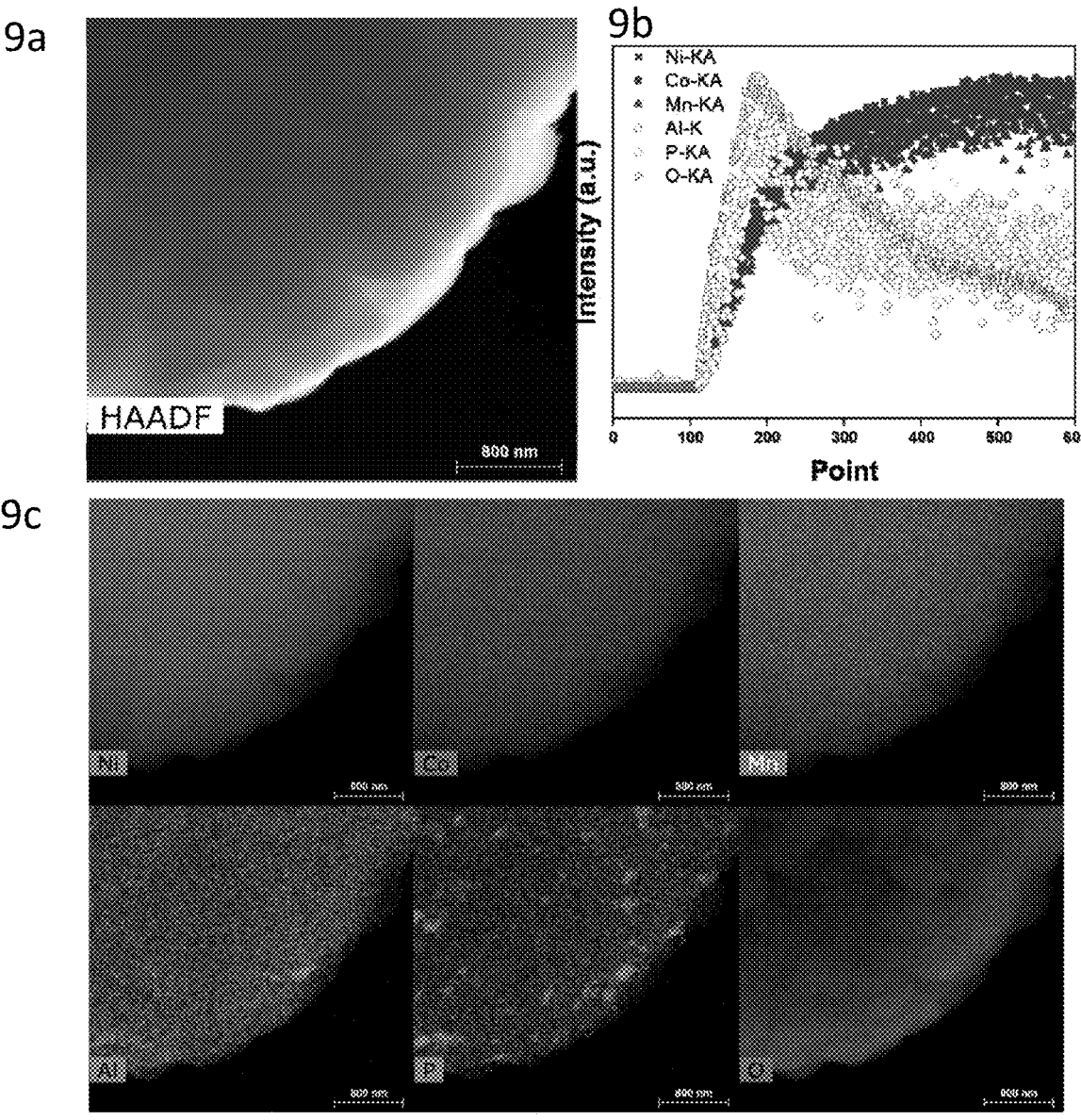
FIGS. 9a-9c show SEM/EDS characterization of the surface modified cathode active materials.
Figure 10A:
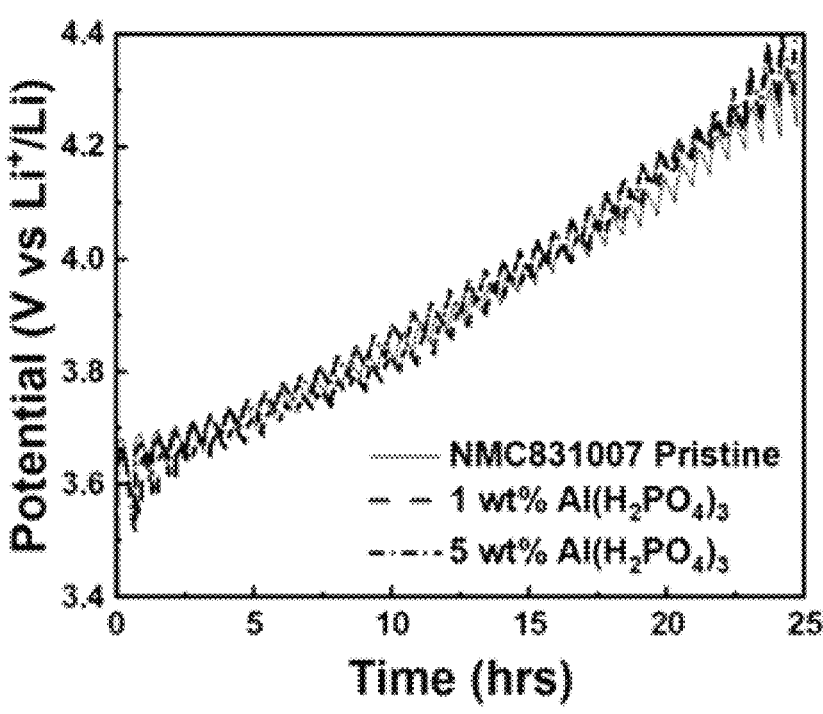
FIGS. 10a-10e show that the surface modification suppresses the growth of interfacial impedance after charge/discharge cycling.
Figure 10B:
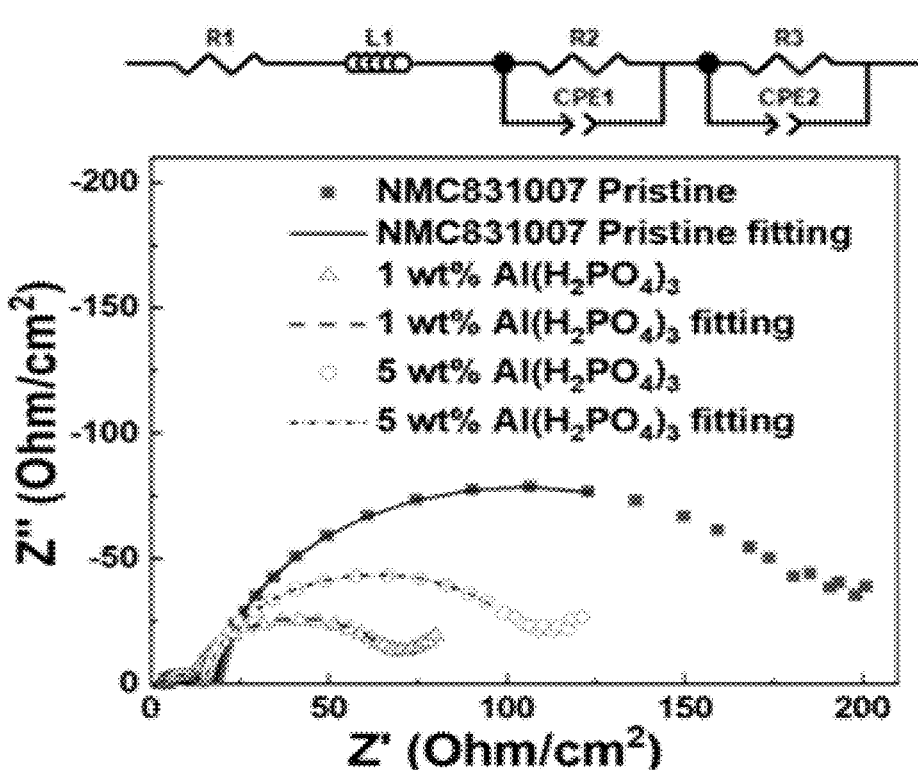
Figure 10C:
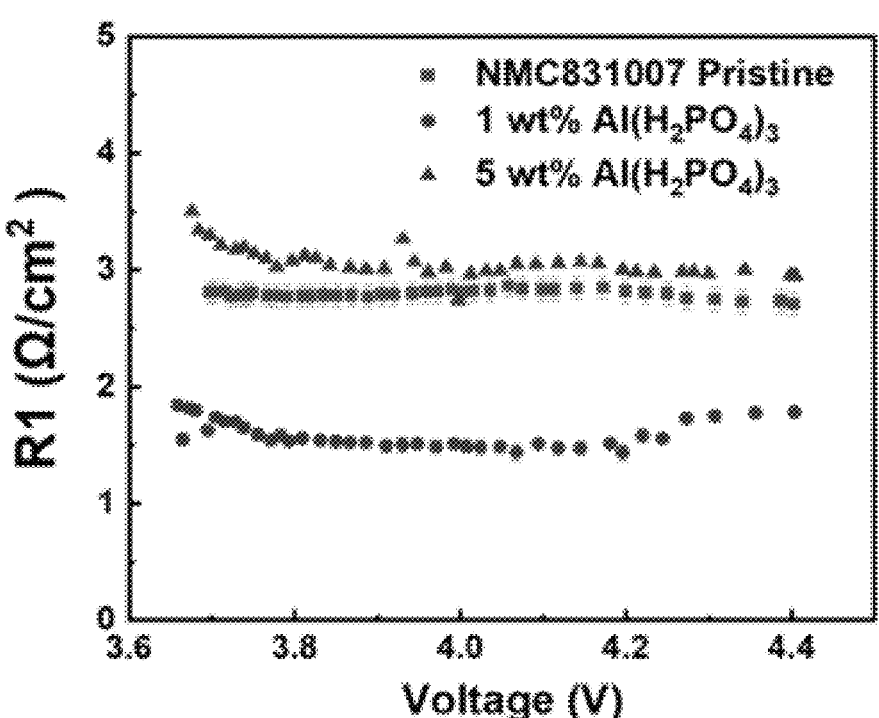
Figure 10D:
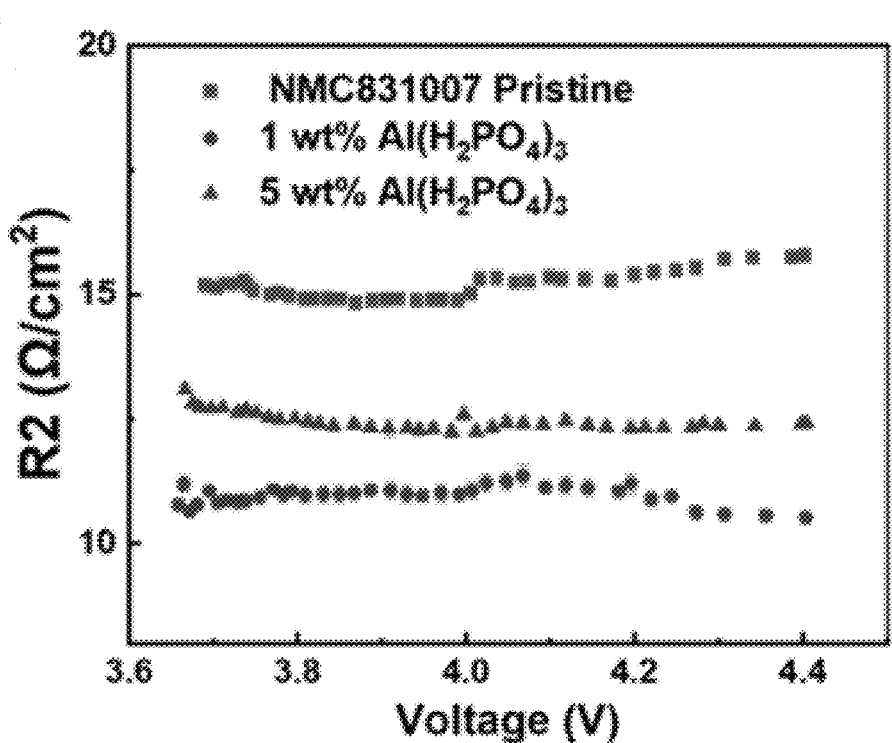
Figure 10E:
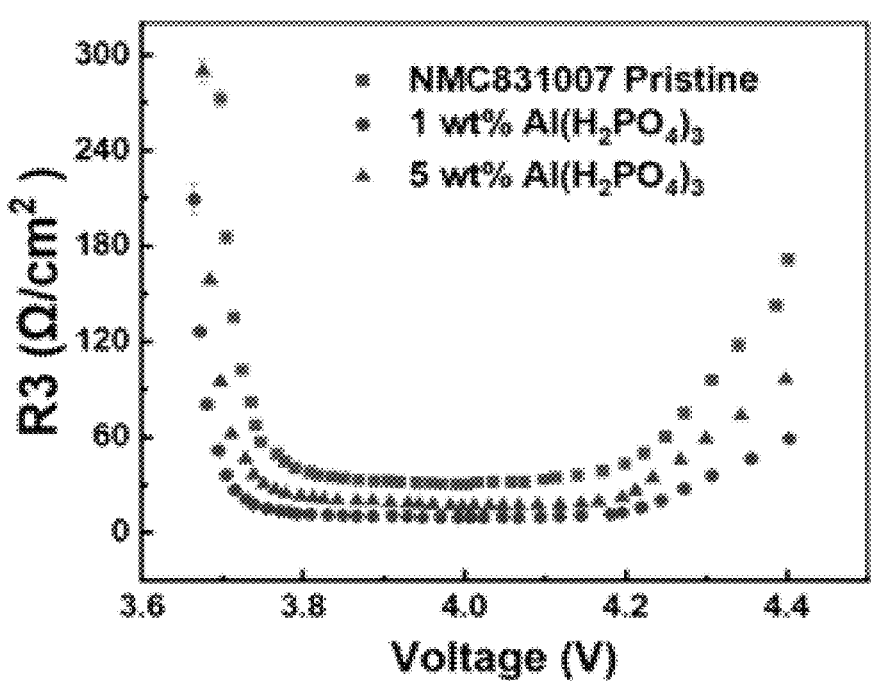

The presence of Al—O and P—O bond (from $Al_3PO_4$ and/or $Li_3PO_4$) in a surface modified cathode active material was demonstrated by XPS characterization (FIGS. 7a-7b), whereas Al or P signal was not observed in samples without surface modification (FIGS. 7c-7d). The $Al_2O_{3+x}$ peak could be due to the less of $PO_4$. Additionally, as shown in FIG. 8, the surface modified cathode active material has a $Li_2CO_3$/ Ni peak area ratio of 0.03, whereas the cathode active material without surface modification has a $Li_2CO_3$/Ni peak area ratio of 0.24, indicating the $Li_2CO_3$ has been significantly reduced after surface modification The presence of Al and P in a surface modified cathode active material was also demonstrated by SEM/EDS (FIGS. 9a-9c), confirming the formation of Al-based and P-based species after converting $Li_2CO_3$ impurity to coatings on the sample. Additionally, "surface coating" of a cathode active material with an Al-based and P-based species was achieved using the present technology. Moreover, the dispersion of P was different from that of Al, and local accumulation of P was observed, suggesting that the P-based species formed in the sample was not completely identical to the Al-based species.

Example 8

Impact of interfacial properties. $Li_2CO_3$ impurity on NMC cathode plays a key role in parasitic reactions, converting the $Li_2CO_3$ impurity to a beneficial coating layer significantly influence interface performance by decreasing parasitic reactions between $Li_2CO_3$ impurity and electrolyte. Furthermore, the surface coating/modification can prevent the cathode materials from having direct contact with the electrolyte and to avoid decomposition or oxidation of electrolyte to protect the cathode material Surface Modification Suppressed the Hike of Interfacial Impedance.

Properties of the pristine sample ($LiNi_{0.83}Mn_{0.1}Co_{0.07}O_2$), and the surface modified cathode active material ($LiNi_{0.83}Mn_{0.1}Co_{0.07}O_2$ treated with a 1 wt % and 5 wt % $Al(H_2PO_4)_3$ solution) were compared.

FIG. 10 shows the evolution of the EIS spectra/impedance for pristine sample ($LiNi_{0.83}Mn_{0.1}Co_{0.07}O_2$), and the surface modified cathode active material ($LiNi_{0.83}Mn_{0.1}Co_{0.07}O_2$ treated with a 1 wt % and 5 wt % $Al(H_2PO_4)_3$ solution) after 50 cycles. FIG. 10(a) shows the three samples' voltage profile during in situ EIS test. FIG. 10(b) demonstrated the fitting results of the impedance at 4.4V of the three samples using the corresponded circuit diagram. FIG. 10(c, d, e) shows the in situ impedance towards/against the voltage. FIG. 10(c) is the R1 circuit diagram, which represent coin half cell series resistance, all 3 samples are small, indicating all cells are good and likely not impactful to performance. R2 in FIG. 10(d) is the interfacial resistance, the 1 wt % $Al(H_2PO_4)_3$-processed sample showed the lowest R2, which likely means the beneficial coating layer is more conductive and has less resistance. R3 in FIG. 10(e) is the charge transfer resistance, 1 wt % $Al(H_2PO_4)_3$ processed sample showed the lowest R3, especially at 4.4V, the cell working voltage, indicate 1 wt % $Al(H_2PO_4)_3$-processed sample has the lowest inactivate surface phases like rock salt, which suppressed the hike of interfacial impedance.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for modifying a surface chemistry of a cathode active material, the process comprising:

(a) providing a powder of the cathode active material;

(b) wetting the powder of cathode active material with a solution to form a mixture; and (c) baking the mixture at an elevated temperature to obtain a surface modified cathode active material;

wherein:

the cathode active material has a formula of $LiNi_xM-n_yCo_{1-x-y}O_2$, wherein $0 \leq x \leq 1$, $0 \leq y \leq 1$, and $0 \leq x+y \leq 1$;

the solution comprises a solvate and a solvent; and the solvate comprises $Ca(H_2PO_4)_2$.

2. The process of claim 1, wherein the solvent comprises water, methanol, ethanol, 2-propanol, iso-butanol, acetone, ethyl methyl ketone, or a combination of any two or more thereof.

3. The process of claim 1, wherein an amount of the solution is from about 2 wt % to about 80 wt % based on the amount of the cathode active material.

4. The process of claim 1, wherein the solution has a pH from about 6 to about 8.

5. The process of claim 1, wherein the solvate has a concentration of about 1 wt % to about 5 wt % in the solution.

6. The process of claim 1, wherein the mixture is baked at a temperature from about 500° C. to about 650° C.

7. The process of claim 1, wherein the cathode active material further comprises a doping element.

8. The process of claim 7, wherein the doping element is Mg, Ca, Zr, Ti, Ta, V, Cr, Fe, Zn, Al, or a combination of any two or more thereof.

9. The process of claim 1, further comprising preparing the cathode active material under a dry air atmosphere.

* * * * *